W. KILBURN.
Seed-Planter.
No. 2,663.
Patented June 11. 1842.
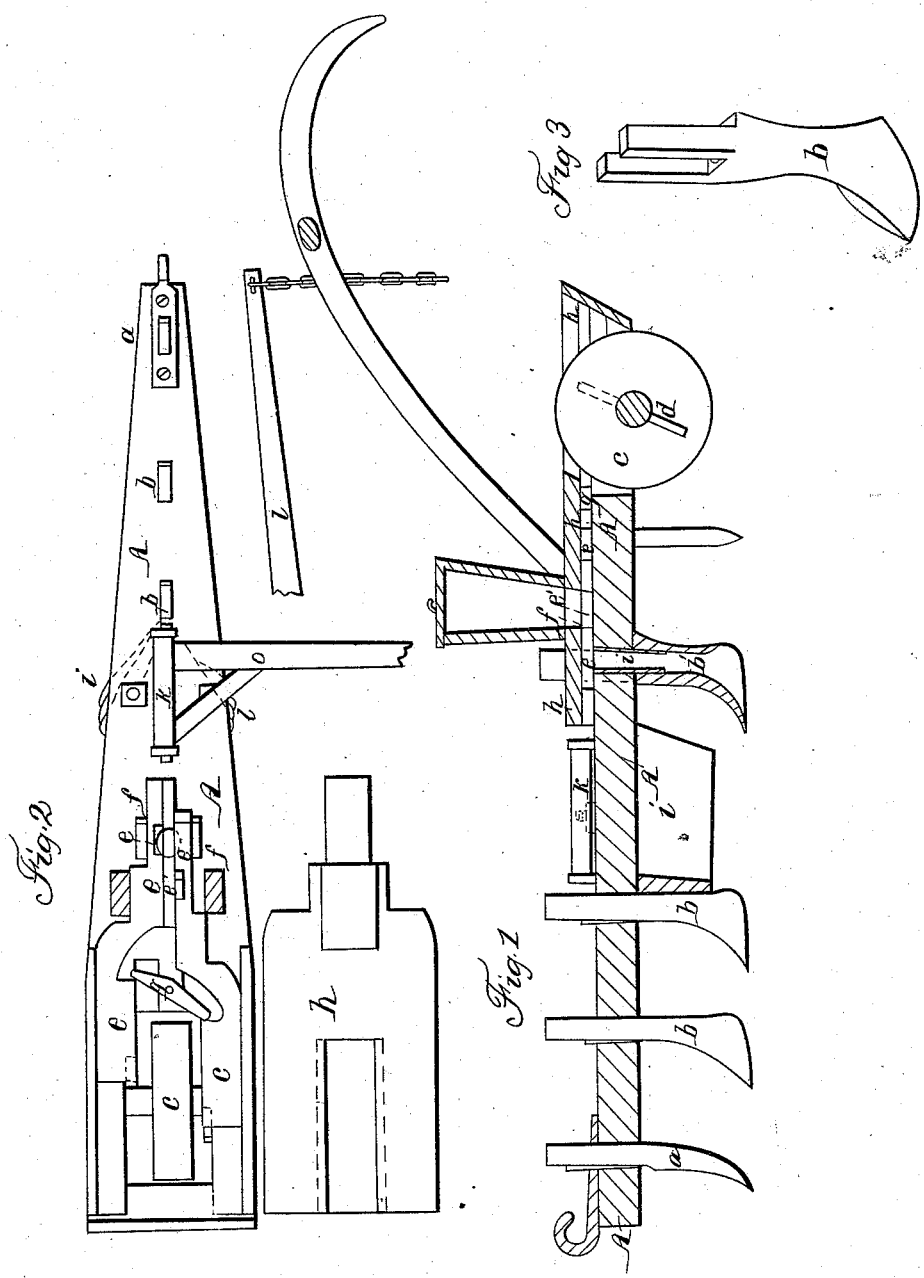

UNITED STATES PATENT OFFICE.

WELLS KILBURN, OF LAWRENCEVILLE, PENNSYLVANIA.

IMPROVEMENT IN SEED-PLANTERS.

Specification forming part of Letters Patent No. 2,663, dated June 11, 1842.

*To all whom it may concern:*

Be it known that I, WELLS KILBURN, of Lawrenceville, in the county of Tioga and State of Pensylvania, have invented a new and useful Improvement in the Machine for Planting Seed; and I do hereby declare that the following is a full, clear, and exact description thereof, reference being had to the accompanying drawings, making a part of this specification, in which—

Figure 1 is a vertical section; Fig. 2, a top view, the hopper and cover being removed; Fig. 3, parts detached.

The bed-piece A is formed similar to many now in use. A cutter, $a$, is placed in its forward end, and in a line back of it are three or more teeth, $b$. The shanks of these teeth and cutter are put through mortises in the bed-piece and fastened by a wedge, so as to be raised or lowered, as desired. The last tooth, $b'$, is made with two shanks, (see Fig. 3,) the body of the tooth being hollow, through which the seed is dropped, as hereinafter described.

The wheel $c$ is placed behind in the bed-piece, which is there forked, so as to admit the upper part of the wheel to rise above it. On each side of this wheel there is an arm or cog, $d$, on the shaft on opposite sides. Directly over them are two horizontal slides, $e$, which move in grooves on the top of the bed-piece. These sides approach each other forward of the wheel, where there is only a single rib between them, and they extend forward beyond the mouth of the hopper. Near their ends notches $e'$ are cut in the edges next the rib. These notches can be contracted at pleasure by inserting a dowel, $f$, of any size into the notch and partially filling it. Just before the wheel a lever, $g$, is placed transversely upon the bed, its fulcrum being in the center, the ends of it entering into notches in the edges of the slides, so that when one is pushed forward the other is forced back by means of the lever.

It will be seen by the position of the cogs on the shaft above named that this arrangement vibrates the slides alternately as the wheel revolves. A hopper of the common construction is fixed upon the cover $h$, which extends over the slides and back to the end of the machine, being divided where the wheel comes through. The mouth of the hopper is directly over the notches $e$, when the slides are drawn back, and a tube, $i$, extending down through the bed into the hollow tooth $b'$ is under the notch $e$ of the slide that is thrust forward, and is designed to make a continuous conductor for the seed through the tooth when it is lowered down so that, its cavity disconnected from the under side of the bed, the shanks of the tooth come through on each side of the slides, the hole being directly between them. It will thus be obvious that when one slide is drawn back the seed in the hopper will fill the notch $e$, and when pushed forward it will carry the contents of the notch over the tube $i$ and drop the seed down through it, the slide at the same time preventing the further egress of the seed till the notch returns. The slide on the other side performs the reverse motion at the same time. They are thus alternately filled at the hopper and convey the seed forward and drop it through the hollow tooth at distances equal to the semi-diameter of the wheel. Should it be desired to drop at half this distance, two more cogs can be added to the shaft at right angles to those already described.

For marking off, a shaft, $k$, is affixed to the bed, and having an arm, $l$, extending out from it forming a crane. This arm is at right angles to the bed, and can be turned over so as to project on either side. A chain may be hooked to this arm at any desired distance from the planter to mark the succeeding furrow.

In some kinds of ground it is necessary to have two teeth—one on each side—between the tooth $b'$ and the wheel, shaped like common harrow-teeth; and just before the tooth $b'$ there is a scraper, $i$, of a triangular shape, which can be raised or lowered like the teeth for removing the lumps and stones from before the tooth.

The cover $h$ has flanges extending down on each side of the wheel, which serve to guide the slides and prevent the dirt from rising up and getting between them and the bed-piece. Behind the wheel there is a scraper, which cleans its periphery. The handles and clevis are like those used in common planters.

What I claim as my invention, and desire to secure by Letters Patent, is—

1. The double slide for dropping seed in a single furrow, constructed and arranged as herein described, and in combination there-with the vibrating lever $g$ for drawing the slides back, as above represented.

2. The hollow tooth having a double shank, constructed in the manner and for the purpose before stated.

3. The tube $i$, running down into the hollow tooth so as to allow it to be raised and lowered, combined and arranged as herein set forth.

4. The arm or crane $k$ for marking the furrows, constructed and arranged in the manner and for the purpose before described.

WELLS KILBURN.

Witnesses:
J. J. GREENOUGH,
J. H. GODDARD.